United States Patent

Assauer

[15] 3,659,702

[45] May 2, 1972

[54] CONVEYOR, PARTICULARLY FOR CHIPS

[72] Inventor: Helmuth Assauer, Wuppertal-Elberfeld, Germany

[73] Assignee: Firma Kobo Kohler & Bovenkamp G.m.b.H., Wuppertal-Barmen, Germany

[22] Filed: June 19, 1970

[21] Appl. No.: 47,652

[30] Foreign Application Priority Data

June 21, 1969   Germany .................. P 19 31 549.2

[52] U.S. Cl. ............................................. 198/221
[51] Int. Cl. ............................................. B65g 25/08
[58] Field of Search ................ 198/168, 221, 224, 195

[56] References Cited

UNITED STATES PATENTS 2,747,725   5/1956   Hatch et al. ...................... 198/195

FOREIGN PATENTS OR APPLICATIONS 831,184   3/1960   Great Britain ...................... 198/24

Primary Examiner—Evon C. Blunk
Assistant Examiner—Hadd S. Lane
Attorney—Woodhams, Blanchard and Flynn

[57] ABSTRACT

Improvement in a conveyor, particularly for chips, comprising hollow conveyor rods movable back and forth adjacent the bottom of a conveyor trough, said conveyor rods being guided on posts extending from the bottom of the conveyor trough through openings into the inside of the conveyor rods, said conveyor rods having conveying elements including barb-shaped pushing blades which occupy only a fractional portion of the cross section of the conveyor trough, the improvement comprising slide bars associated with the lateral edges of the conveyor rod opening for minimizing wear of the post.

2 Claims, 7 Drawing Figures

PATENTED MAY 2 1972

INVENTOR
HELMUTH ASSAUER
BY
Woodhams, Blanchard & Flynn
ATTORNEYS

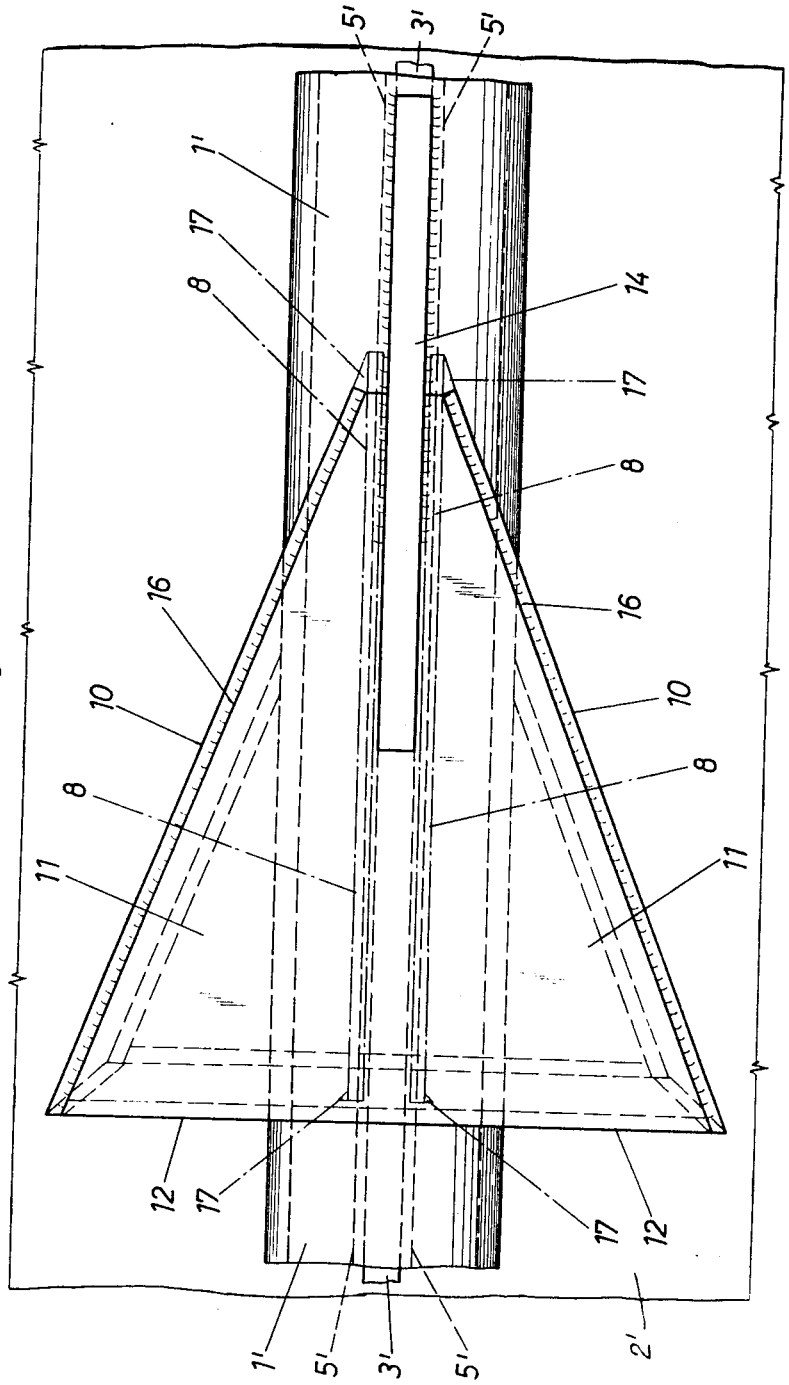

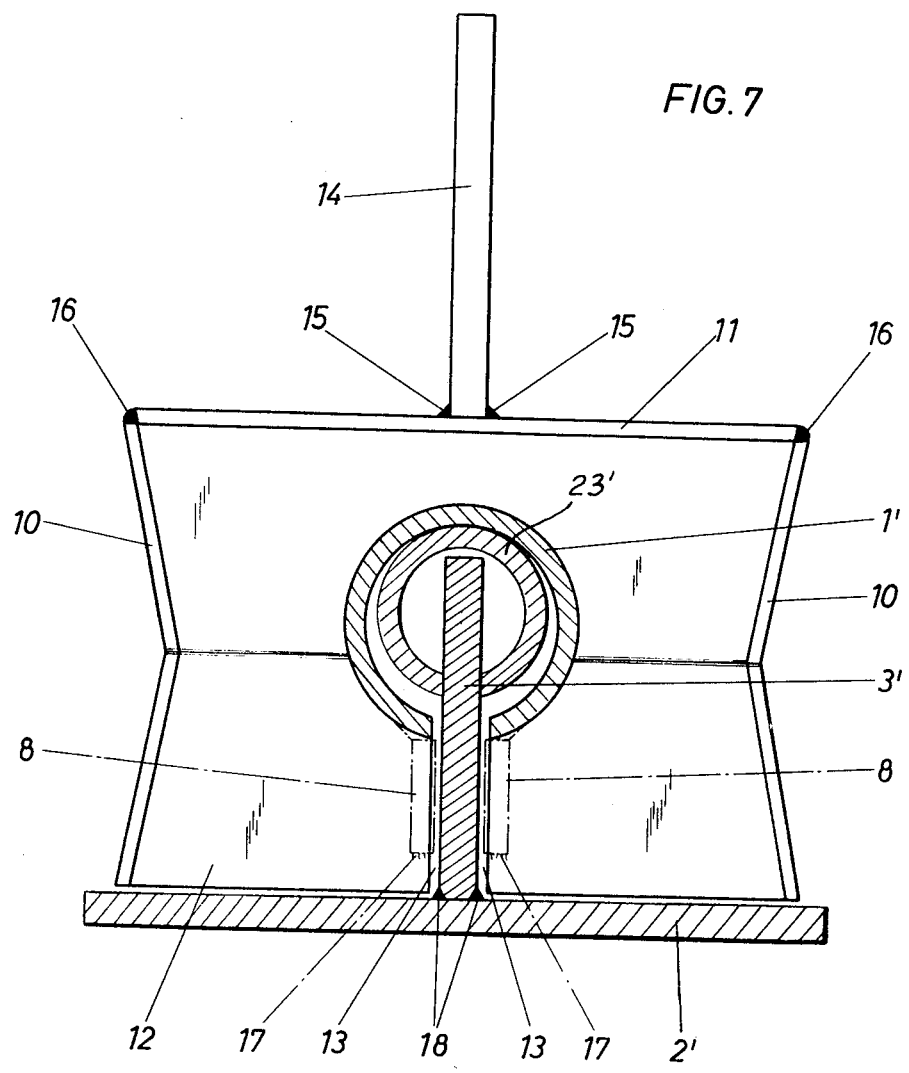

0
CONVEYOR, PARTICULARLY FOR CHIPS

This invention relates to a chip conveyor comprising hollow conveyor rods which reciprocate or move back and forth on the bottom of a conveyor trough, said conveyor rods being guided on posts positioned adjacent the bottom of the conveyor trough with the posts extending through openings into the inside of the conveyor rods. The conveyor rods have barb-shaped pushing blades which occupy only a fractional portion of the cross section of the conveyor trough.

It was found in the case of known constructions of this type that, due to circumstances which are difficult to predict, during the operation of the chip conveyor an angular movement of the conveyor rod occurs about the longitudinal axis of the guide post whereby the edge of the opening in the rod is pressed laterally against the post so that the post wears rapidly. In particular, the sharp outer edge of the opening penetrates knife-like into the post and small steel chips being conveyed also accumulate at the edge and participate in the wearing process.

The purpose of the invention is to construct the same type of conveyor for chips in such a manner that the above-mentioned deficiency is overcome in a simple manner and at a low cost and that further advantages in operation are obtained.

For this purpose, according to the invention, slide bars are associated, preferably spaced from one another, with the lateral edges of the opening of the conveyor rod. The slide bars can, according to the invention, in a simple manner be stationarily arranged on the broad surfaces of the post opposite the lateral edges of the opening in the conveyor rod.

In order to obtain a smaller specific surface pressure of the slide surfaces, the slide bars can also according to the invention extend from the lateral edges of the opening of the conveyor rod in a direction toward the conveyor trough bottom and parallel to the side surfaces of the post.

It is advantageous in this construction that, according to the invention, the broad surface of each slide bar, which broad surface faces the post, projects inwardly beyond the edge of the opening in the rod.

A strong and protected type of construction with reference to the arrangement and reliability of operation of the slide bars is obtained, according to the invention, when the front side of each slide bar is connected, preferably welded, to the front wall of the barbed conveying element which is constructed to form a closed box.

In this construction the upwardly directed blade or barb can also, according to the invention, be connected, preferably welded, to the cover plate of the box. Furthermore, bevels are advantageously provided at an angle of about 45° and are filled with the weld bead in the zone of the welding edges for applying the welding seam for the purpose of securement of the post to the trough bottom.

The construction of the invention brings about considerable advantages, namely, that the above-mentioned accelerated wear of the post extending into the inside of the conveyor rod is prevented. The working order is secured at an optimum height and, furthermore, the power consumption is reduced because it is not necessary to overcome additional friction losses caused by a scraping effect of the sliding lateral edges on rough abutment surfaces. Thus, the advantage is obtained that both full-length or continuous slide bars can be provided or, also, particularly in the case of the box-shaped construction of the barbed conveying element, only single short slide bar pieces can be provided which are more advantageous because a better supporting abutment on the post is achieved. Also, short slide pieces can later be easily mounted into existing conveyor troughs without changing the conveyor rod opening. Due to the box-shaped construction of the barbed conveying element, which construction gives a high stability, the wedge or lateral cutting effect of the conveyor rod is also overcome. By this means, among others, the welding seam of the post at the trough bottom is also protected.

Exemplary embodiments of the invention are illustrated in the drawings, in which:

FIG. 6 is a top view of FIG. 5.

FIG. 7 is a front view of the post and conveying element of FIGS. 5 and 6.

The present invention relates to a conveyor which is particularly suitable for transporting metal chips and is generally referred to as a harpoon-type conveyor. The harpoon-type conveyor comprises a plurality of interconnected conveyor units slideably positioned for reciprocating movement within a trough-shaped housing, which housing extends from a receiving station to a discharge station which may be positioned at an elevation above or below the receiving station. The housing has an elongated rail or post, including a cylindrical portion fixedly secured adjacent the bottom thereof and extending longitudinally within the housing for slidably supporting the harpoon conveyor thereon.

The above-described conveyor structure is illustrated in greater detail in my copending application Ser. No. 807,684, filed Mar. 17, 1969, and thus will not be described in detail in this application. The present invention deals with an improvement in the above-described structure.

Figure 2:
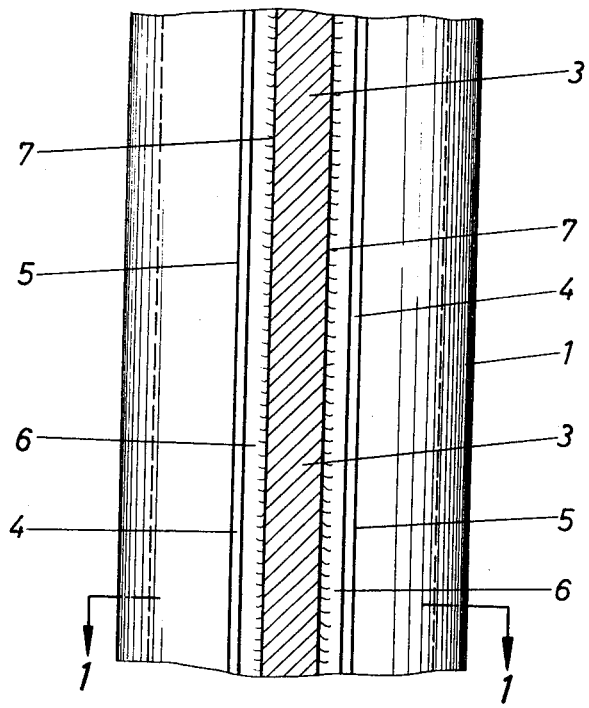
FIG. 2 is a longitudinal cross-sectional view along the line II—II of FIG. 1.
Figure 1:
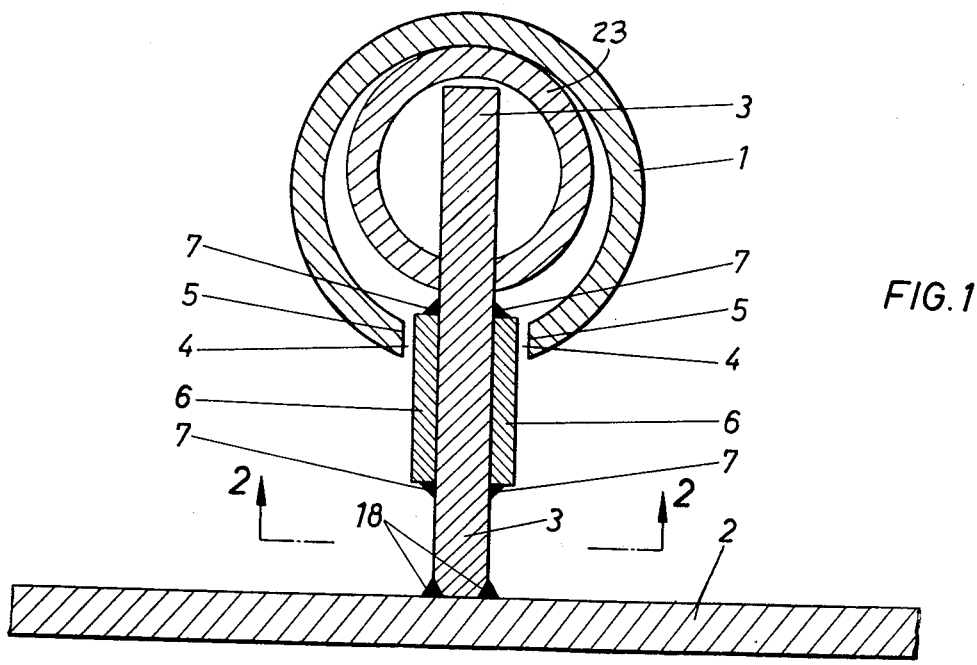
FIG. 1 is a cross-sectional view, along the line I—I of FIG. 2, of a conveyor rod and slide bars associated therewith and positioned on the post.

The conveyor rod 1 of the conveyor, which rod in cross section is constructed as a hollow profile, preferably having the shape of a pipe, generally is quite long and is guided on post means which includes a plate or post 3 which extends upwardly from the bottom 2 of the conveyor trough. The post 3 extends through an opening 4 into the inside of the conveyor rod 1. The post 3 has a cylindrical rail portion 23 fixedly secured thereto adjacent the free (upper) end thereof for slidably supporting the rod 1, which cylindrical portion has a diameter substantially less than the internal diameter of rod 1 as illustrated in FIG. 1. Barb-like pushing blades, so-called spurs, are arranged on the conveyor rod 1 in a known manner. The pushing blades move the chips (metal chips and the like) deposited into the trough forward step-by-step as a result of the back and forth movement of the conveyor rod.

Slide bars or wear plates 6 are associated with the lateral edges 5 of the opening 4 of the conveyor rod 1 and are located on both sides of the post 3. Said slide bars 6 are, according to FIG. 1, stationarily arranged on the broad side surfaces of the post and are positioned in opposition to the lateral edges 5 of the opening. The mounting can advantageously be accomplished by means of welds 7.

If, for example, due to a one-sided loading of the trough, the conveyor rod 1 starts to rotate or move angularly about its longitudinal axis, the lateral edge 5 of the opening of the loaded side bears against the surface of the respectively opposite slide bar 6. Through this, the conveyor rod is supported in the direction of rotation (about its longitudinal axis).

The slide bars 6 advantageously extend along the entire length of the conveyor rod. After a long time when wear of the slide bars occurs, the slide bars can be replaced, which can be done in a very simple manner.

Figure 4:
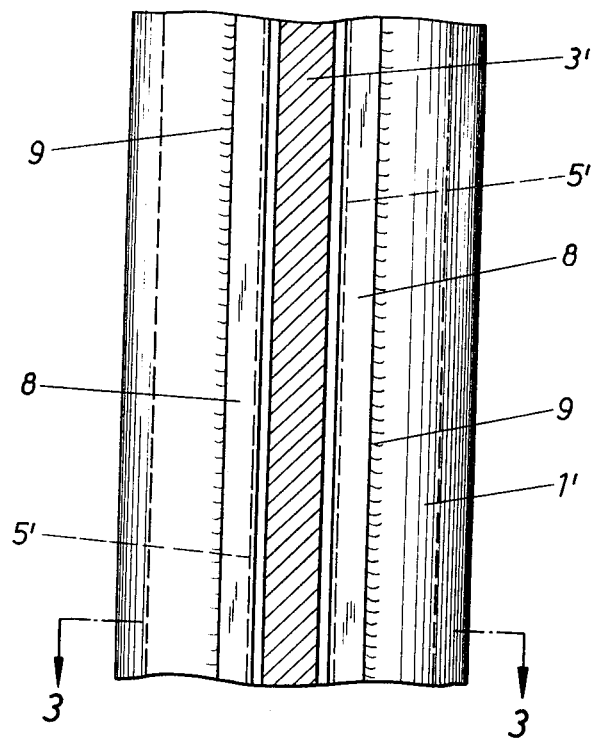
FIG. 4 is a longitudinal cross-sectional view along the line IV—IV of FIG. 3.
Figure 3:
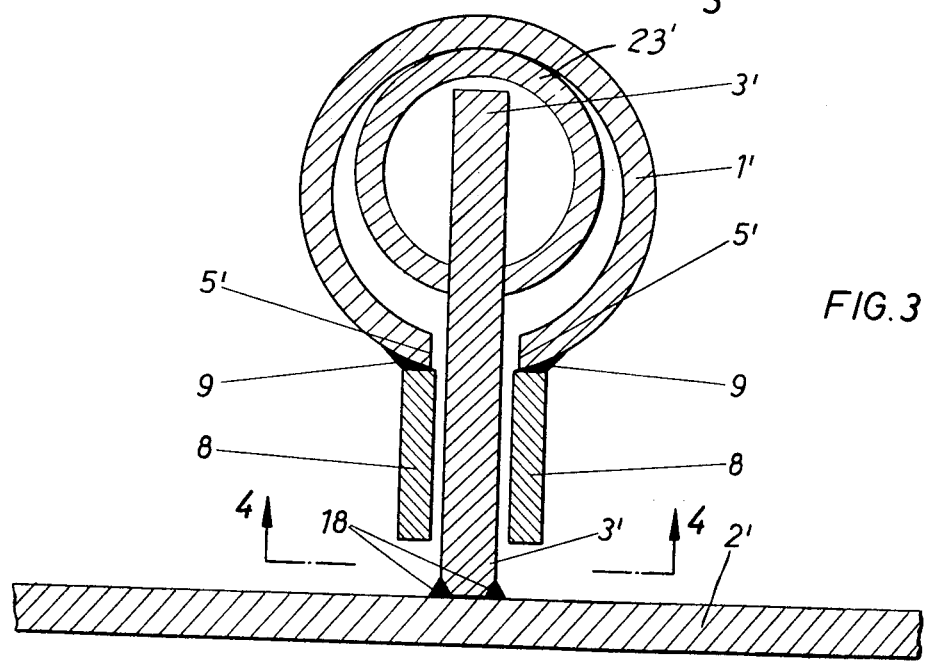
FIG. 3 is a cross-sectional view, along the line III—III of FIG. 4, of a modified construction in which the slide bars extend from the lateral edges of the opening of the conveyor rod and parallel to the side surfaces of the post.

In the embodiment illustrated in FIGS. 3 and 4, the slide bars 8 are mounted on the conveyor rod 1' adjacent the lateral edges 5' of the opening. The slice bars 8 advantageously project slightly inwardly of the lateral edges 5' and extend toward the bottom of the conveyor trough 2'. The slide bars 8 extend approximately parallel to the side surfaces of the post 3'.

The slide bars 8 are in this embodiment, advantageously provided in the form of short sections which are arranged at longitudinally spaced intervals.

Figure 5:
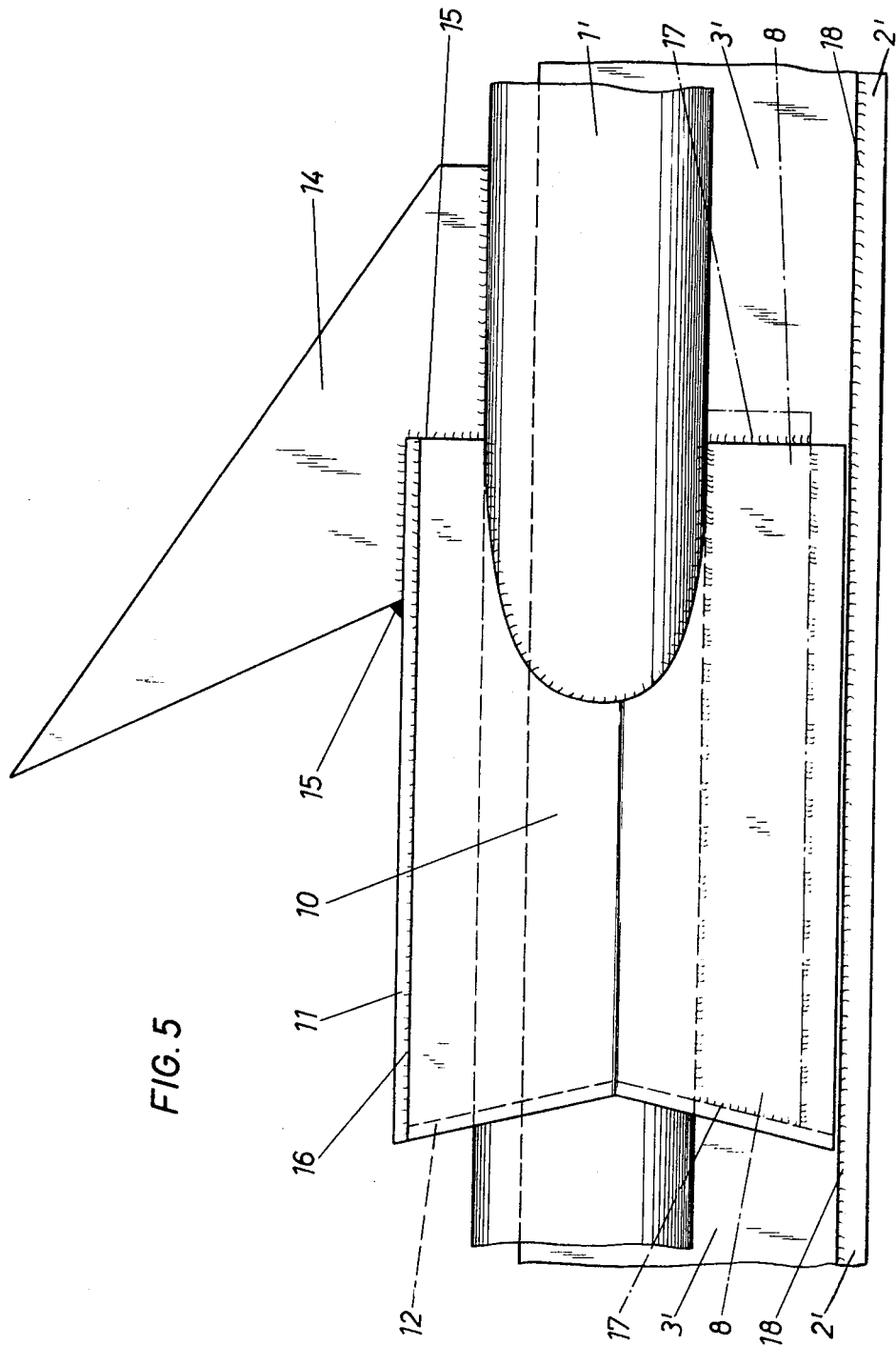
FIG. 5 is a side elevational view of a further modification in which the slide bars form with the pushing blades or barbs a box-shaped construction arranged on the conveyor rod.

According to the embodiment of FIGS. 5–7, the conveying elements are advantageously constructed to form a closed box. The horizontal spurs or pushing blades are formed of flank sheets 10 which extend at an acute angle to the longitudinal axis of the conveyor rod 1' (FIG. 6) and are closed off on their upper sides by a sheet 11. An angled front wall 12 which has a welded edge at 16 and is secured to both the flank sheets 10 and also to the cover sheet 11. The front wall 12 surrounds the conveyor rod 1' tightly abutting same and has a vertical opening 13 (FIG. 7) through which extends the post 3'. The post 3' extends upwardly from the trough bottom 2'.

The slide bars 8 are secured to the conveyor rod 1' and are connected to the front wall 12, preferably by means of welding, at 17. They extend approximately over the entire length of the box-shaped spur. Furthermore, the rearward portions of the lateral pushing blades 10 (rightward end in FIG. 5) have elliptical recesses which chamfered edges so that they fit snugly around the rod 1'.

The rear edge of the blade 10 extends under the slotted rod 1' and terminates at the opening 5' of the rod so that the slide bars 8 can also be welded, at 17, vertically to the rearward edge of the blade 10 as well as to front wall 12. By this construction, the conveying element is given a high stability.

An upwardly directed blade 14 is arranged in such a manner that is is connected both to the conveyor rod 1 and to the cover plate 11 of the box, preferably by means of welding at 15.

The box-shaped construction of the conveying element makes the conveying of chips easier and prevents, among other things, the clamping of chips on the slide bars. These slide bars 8 can also be positioned far down toward the trough bottom which is advantageous. The welding seam 18 for securing the post 3' is advantageously arranged under the post by beveling the welding edge at an angle of about 45°.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A harpoon-type conveyor, comprising:
   means defining an elongated conveyor trough;
   elongated post means fixedly secured to and extending upwardly from the bottom of said conveyor trough means and extending longitudinally of said conveyor trough means, said post means comprising substantially vertically extending plate means and cylindrical rail means fixedly connected to said plate means adjacent the upper end thereof;
   at least one hollow cylindrical conveyor rod having an elongated slot-like opening extending longitudinally along the lower portion thereof, said opening having a pair of laterally spaced edges, the spacing between said edges being sufficient to receive said plate means therebetween;
   said hollow cylindrical conveyor rod being disposed in surrounding relationship to said cylindrical rail means for permitting said conveyor rod to move back and forth relative to said elongated post means, said conveyor rod having an internal diameter substantially larger than the external diameter of said cylindrical rail means whereby the upper inside surface of said hollow conveyor rod is slidably supported on the upper surface of said rail means with the remaining inside surface of the hollow conveyor being substantially spaced from and free of contact with the exterior surface of said rail means, whereby said conveyor rod tends to pivot about the area of engagement of said conveyor rod with the upper surface of said cylindrical rail means, the magnitude of pivotal movement being sufficient to tend to cause an engagement of said edges of said opening with the laterally facing side surfaces of said plate means;
   conveying means mounted on said hollow conveyor rod for movement therewith; and
   slide bar means mounted between said edges of said opening in said conveyor rod and said laterally facing side surfaces of said plate means for minimizing wear of said laterally facing side surfaces of said elongated post means due to engagement of said edges of said opening caused by a pivotal movement of said conveyor rod relative to said post means;
   said slide bar means including a pair of substantially parallel wear plates disposed between the edges of said opening and fixedly secured to the opposite side surfaces of said plate means, the combined thickness of said pair of wear plates and said plate means being less than the width of said slot-like opening as defined between said spaced edges, whereby said edges are normally spaced from the external side faces of said wear plates, said edges being engageable with said side faces in response to pivotal movement of said conveyor rod relative to said rail means.

2. A harpoon-type conveyor, comprising:
   means defining an elongated conveyor trough;
   elongated post means fixedly secured to and extending upwardly from the bottom of said conveyor trough means and extending longitudinally of said conveyor trough means, said post means comprising substantially vertically extending plate means and cylindrical rail means fixedly connected to said plate means adjacent the upper end thereof;
   at least one hollow cylindrical conveyor rod having an elongated slot-like opening extending longitudinally along the lower portion thereof, said opening having a pair of laterally spaced edges, the spacing between said edges being sufficient to receive said plate means therebetween;
   said hollow cylindrical conveyor rod being disposed in surrounding relationship to said cylindrical rail means for permitting said conveyor rod to move back and forth relative to said elongated post means, said conveyor rod having an internal diameter substantially larger than the external diameter of said cylindrical rail means whereby the upper inside surface of said hollow conveyor rod is slidably supported on the upper surface of said rail means with the remaining inside surface of the hollow conveyor being substantially spaced from and free of contact with the exterior surface of said rail means, whereby said conveyor rod tends to pivot about the area of engagement of said conveyor rod with the upper surface of said cylindrical rail means, the magnitude of pivotal movement being sufficient to tend to cause an engagement of said edges of said opening with the laterally facing side surfaces of said plate means;
   conveying means mounted on said hollow conveyor rod for movement therewith; and
   slide bar means mounted between said edges of said opening in said conveyor rod and said laterally facing side surfaces of said plate means for minimizing wear of said laterally facing side surfaces of said elongated post means due to engagement of said edges of said opening caused by a pivotal movement of said conveyor rod relative to said post means;
   said slide bar means including a pair of substantially parallel wear plates fixedly secured to said conveyor rod adjacent said spaced edges, said wear plates extending substantially vertically and being disposed on opposite sides of said plate means, at least a portion of said wear plates projecting inwardly beyond their respective edges, said wear plates having inner side faces disposed substantially parallel to the side surfaces of said plate means, the inner side faces of said pair of wear plates being spaced apart by a distance greater than the thickness of said plate means as defined between the opposite sides surfaces thereof, whereby said wear plates are normally spaced from said plate means, the inner side faces of said wear plates being engageable with the side surfaces of said plate means in response to pivotal movement of said conveyor rod relative to said rail means.

* * * * *